(12) United States Patent
Pieczul et al.

(10) Patent No.: US 11,936,678 B2
(45) Date of Patent: Mar. 19, 2024

(54) SYSTEM AND TECHNIQUES FOR INFERRING A THREAT MODEL IN A CLOUD-NATIVE ENVIRONMENT

(71) Applicant: Oracle International Corporation, Redwood Shores, CA (US)

(72) Inventors: Olgierd Stanislaw Pieczul, Dublin (IE); Junaid Khan, North Bend, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/569,954

(22) Filed: Jan. 6, 2022

(65) Prior Publication Data

US 2023/0216876 A1    Jul. 6, 2023

(51) Int. Cl.
| | | |
|---|---|---|
| *H04L 9/40* | (2022.01) | |
| *G06F 16/25* | (2019.01) | |
| *H04L 41/0853* | (2022.01) | |
| *H04L 41/14* | (2022.01) | |
| *H04L 41/22* | (2022.01) | |
| *H04L 45/00* | (2022.01) | |
| *H04L 67/1036* | (2022.01) | |
| *H04L 67/51* | (2022.01) | |

(52) U.S. Cl.
CPC ...... *H04L 63/1433* (2013.01); *H04L 41/0853* (2013.01); *H04L 41/145* (2013.01); *H04L 41/22* (2013.01); *H04L 67/1036* (2013.01); *H04L 67/51* (2022.05)

(58) Field of Classification Search
CPC ............. H04L 63/1433; H04L 41/0853; H04L 41/145; H04L 41/22; H04L 67/1036; H04L 67/51; H04L 41/5096; H04L 41/142; H04L 41/5058; H04L 63/1408; H04L 63/1416; H04L 63/1441; H04L 63/20

See application file for complete search history.

(56) References Cited

U.S. PATENT DOCUMENTS

| | | | | |
|---|---|---|---|---|
| 9,137,110 | B1* | 9/2015 | Adogla | H04L 41/145 |
| 10,924,410 | B1* | 2/2021 | Nee | H04L 67/566 |
| 11,463,416 | B1* | 10/2022 | Ashman | H04L 67/133 |
| 11,477,072 | B2* | 10/2022 | Costa | H04L 43/0876 |
| 11,575,696 | B1* | 2/2023 | Ithal | H04L 63/1433 |
| 2018/0191771 | A1* | 7/2018 | Newman | G06F 21/552 |

(Continued)

*Primary Examiner* — Schquita D Goodwin
(74) *Attorney, Agent, or Firm* — Invoke

(57) ABSTRACT

In some aspects, a server device may identify one or more services of a cloud infrastructure via a management layer. The server device may determine service information and configuration information for the one or more services. The server device may generate an environment model based at least in part on the service information and the configuration information, the environment model providing information on relationship between one or more components of the cloud infrastructure. The server device may determine one or more threats to the one or more services based at least in part on analyzing the environment model and accessing a threat information database. The server device may generate a threat model that lists the one or more threats to the one or more services. The server device may generate one or more recommendations for the cloud infrastructure based at least on the threat model.

27 Claims, 10 Drawing Sheets

(56) References Cited

U.S. PATENT DOCUMENTS

| | | | |
|---|---|---|---|
| 2019/0044820 A1* | 2/2019 | Rosh | H04L 41/12 |
| 2019/0354690 A1* | 11/2019 | Brigandi | H04W 12/126 |
| 2020/0162336 A1* | 5/2020 | Gonguet | H04L 41/0893 |
| 2021/0099478 A1* | 4/2021 | Seetharamaiah | H04L 63/14 |
| 2021/0266228 A1* | 8/2021 | Reehil | H04L 41/122 |
| 2021/0352087 A1* | 11/2021 | Ryver | H04L 63/1416 |
| 2021/0400063 A1* | 12/2021 | Tackabury | H04L 63/1433 |
| 2021/0409292 A1* | 12/2021 | Murugan | H04L 67/01 |
| 2022/0094705 A1* | 3/2022 | Tineo | G06F 21/554 |
| 2022/0400131 A1* | 12/2022 | Shao | G06N 3/09 |
| 2023/0102386 A1* | 3/2023 | Zhang | G10L 15/22 |
| | | | 704/251 |
| 2023/0177169 A1* | 6/2023 | Bulut | H04L 9/002 |
| | | | 726/1 |
| 2023/0179622 A1* | 6/2023 | Underwood | H04L 63/20 |
| | | | 726/25 |

\* cited by examiner

SYSTEM AND TECHNIQUES FOR INFERRING A THREAT MODEL IN A CLOUD-NATIVE ENVIRONMENT

BACKGROUND

Building secure applications on a cloud-based system can challenge traditional security practices. The use of a shared responsibility model and the dynamic nature of the infrastructure can make traditional modeling of threats difficult. Cloud infrastructure can evolve and thus can provide new and sometimes unexpected features. Mitigation techniques may provide mechanisms for resolving some security problems, but the techniques may also introduce new security issues. Significant changes to the infrastructure itself may emerge from trivial changes in configuration.

For example, an engineer building a system in the cloud may deal with virtual networks provided by the cloud. Even if experienced with traditional networking, or cloud networks of other vendors, the engineer may not fully comprehend all the aspects of the various services provided by the cloud infrastructure. For example, an ability to declare a specific subnet of the network as "public" and therefore allow devices in the network to use public addresses may be counter-intuitive or unexpected. Traditionally, exposing network devices to public addresses may be a major configuration task requiring a network redesign.

For these reasons, understanding of all the threats in the cloud-based system can be difficult and often requires extended experience with the specific infrastructure of a specific vendor.

SUMMARY

Certain embodiments of the present disclosure can provide methods, systems, and a computer-readable storage medium for inferring a threat model in a cloud-based environment.

In some aspects, a method includes: identifying one or more services of a cloud infrastructure via a management layer; determining service information and configuration information for the one or more services; generating an environment model based at least in part on the service information and the configuration information, the environment model providing information on the relationship between one or more components of the cloud infrastructure; determining one or more threats to the one or more services based at least in part on analyzing the environment model and accessing a threat information database; generating a threat model that lists the one or more threats to the one or more services; and generating one or more recommendations for the cloud infrastructure based at least in part on the threat model.

In some aspects, at least one of the service information or the configuration information is determined based at least in part on metadata stored for each of the one or more services.

In some aspects, the method includes accessing the metadata stored for a particular service of the one or more services; comparing the accessed metadata to a service information database to identify one or more features of the particular service; and storing the one or more features with the particular service in a memory.

In some aspects, the method includes accessing the metadata stored for a particular service of the one or more services; comparing the accessed metadata to a configuration database to identify one or more configurations of the particular service; and storing the one or more configurations for the particular service in a memory.

In some aspects, the method includes receiving information about one or more resources for the cloud infrastructure, wherein the one or more recommendations comprise a recommendation to reassign the one or more resources.

In some aspects, the one or more resources comprise at least one of a compute instance resource, a virtual network resource, a subnet resource, a load balancer resource, or an access control resource.

In some aspects, the method includes adding a new service to the cloud infrastructure; determining one or more threats to the new service based at least in part on analyzing the environment model and accessing a threat information database; updating the threat model based at least on the threats of the new service; and generating one or more secondary recommendations for the cloud infrastructure based at least in part on the updated threat model.

In some aspects, the method includes generating a graphical user interface to allow a user to select one or more services for conducting a threat analysis; receiving a selection of one of the one or more services by a user for generating the threat model; and preparing the one or more recommendations for display on the graphical user interface.

In some aspects, a server device includes: one or more memories; and one or more processors, communicatively coupled to the one or more memories, configured to: identify one or more services of a cloud infrastructure via a management layer; determine service information and configuration information for the one or more services; generate an environment model based at least in part on the service information and the configuration information, the environment model providing information on the relationship between one or more components of the cloud infrastructure; determine one or more threats to the one or more services based at least in part on analyzing the environment model and accessing a threat information database; generate a threat model that lists the one or more threats to the one or more services; and generate one or more recommendations for the cloud infrastructure based at least in part on the threat model.

In some aspects, at least one of the service information or the configuration information is determined based at least in part on metadata stored for each of the one or more services.

In some aspects, the one or more processors are further configured to: access the metadata stored for a particular service of the one or more services; compare the accessed metadata to a service information database to identify one or more features of the particular service; and store the one or more features with the particular service in a memory.

In some aspects, the one or more processors are further configured to: access the metadata stored for a particular service of the one or more services; compare the accessed metadata to a configuration database to identify one or more configurations of the particular service; and store the one or more configurations for the particular service in a memory.

In some aspects, the one or more processors are further configured to: receive information about one or more resources for the cloud infrastructure, wherein the one or more recommendations comprise a recommendation to reassign the one or more resources.

In some aspects, the one or more resources comprise at least one of a compute instance resource, a virtual network resource, a subnet resource, a load balancer resource, or an access control resource.

In some aspects, the one or more processors are further configured to: add a new service to the cloud infrastructure;

determine one or more threats to the new service based at least in part on analyzing the environment model and accessing a threat information database; update the threat model based at least on the threats of the new service; and generate one or more secondary recommendations for the cloud infrastructure based at least in part on the updated threat model In some aspects, the one or more processors are further configured to: generate a graphical user interface to allow a user to select one or more services for conducting a threat analysis; receive a selection of one of the one or more services by a user for generating the threat model; and prepare the one or more recommendations for display on the graphical user interface.

In some aspects, a non-transitory computer-readable medium storing a set of instructions includes: one or more instructions that, when executed by one or more processors of a computing device, cause the computing device to: identify one or more services of a cloud infrastructure via a management layer; determine service information and configuration information for the one or more services; generate an environment model based at least in part on the service information and the configuration information, the environment model providing information on the relationship between one or more components of the cloud infrastructure; determine one or more threats to the one or more services based at least in part on analyzing the environment model and accessing a threat information database; generate a threat model that lists the one or more threats to the one or more services; and generate one or more recommendations for the cloud infrastructure based at least in part on the threat model.

In some aspects, at least one of the service information or the configuration information is determined based at least in part on metadata stored for each of the one or more services.

In some aspects, the one or more instructions further cause the computing device to: access the metadata stored for a particular service of the one or more services; compare the accessed metadata to a service information database to identify one or more features of the particular service; and store the one or more features with the particular service in a memory.

In some aspects, the one or more instructions further cause the computing device to: access the metadata stored for a particular service of the one or more services; compare the accessed metadata to a configuration database to identify one or more configurations of the particular service; and store the one or more configurations for the particular service in a memory.

Reference to the remaining portions of the specification, including the drawings and claims, will realize other features and advantages of disclosed embodiments. Further features and advantages, as well as the structure and operation of various examples of the present disclosure, are described in detail below with respect to the accompanying drawings. In the drawings, like reference numbers can indicate identical or functionally similar elements.

These and other embodiments are described in detail below. For example, other embodiments are directed to systems, devices, and computer-readable media associated with methods described herein.

A better understanding of the nature and advantages of embodiments of the present disclosure may be gained with reference to the following detailed description and the accompanying drawings.

DETAILED DESCRIPTION OF THE DRAWINGS

Figure 1:
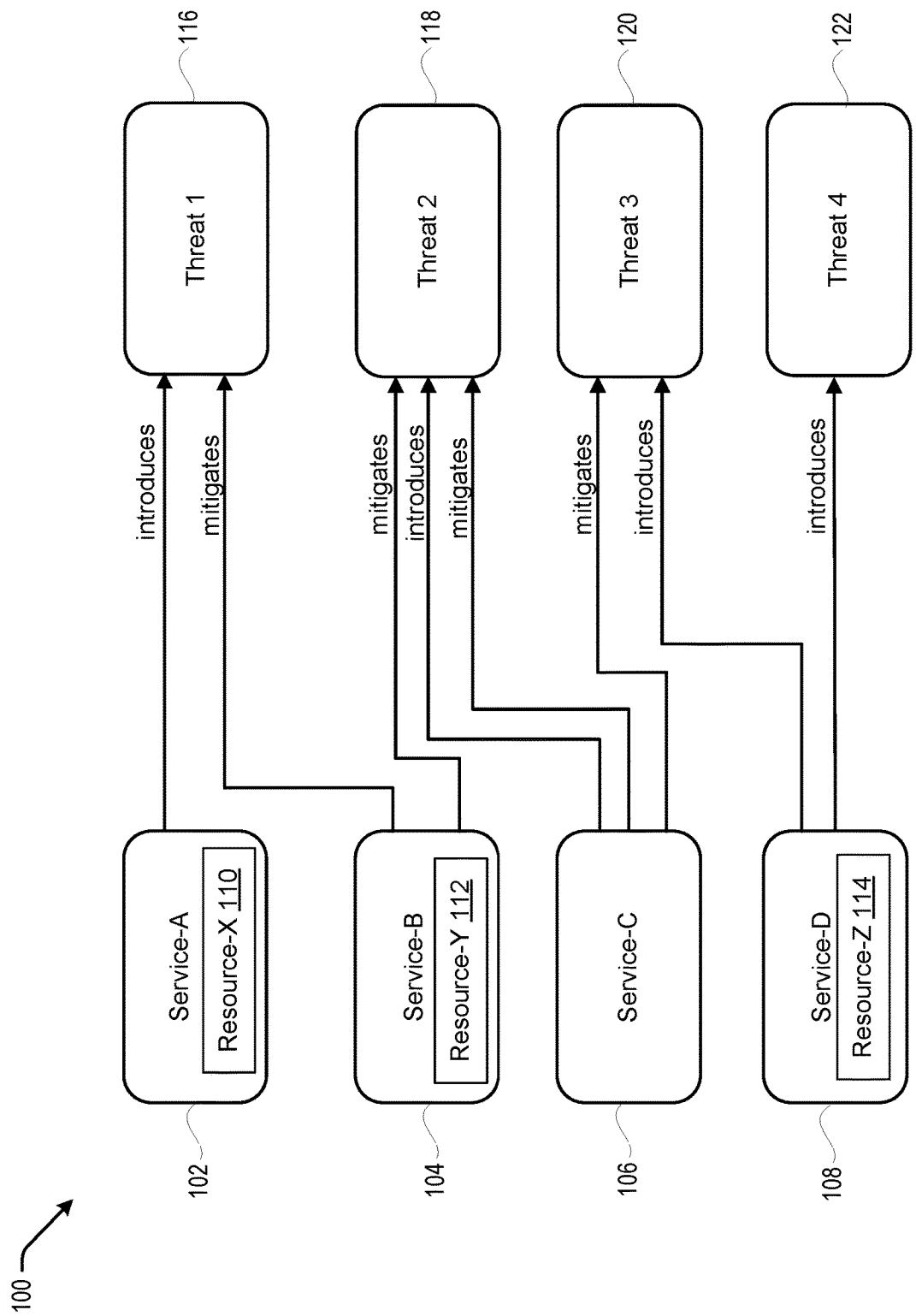
FIG. 1 illustrates an exemplary cloud workload and environment as an inter-connected set of resources.

The following detailed description of example implementations refers to the accompanying drawings. The same reference numbers in different drawings may identify the same or similar elements.

A shared responsibility model may challenge traditional threat and risk modeling systems. Certain layers of security may not be installed by the customer themselves and are instead intrinsic to cloud services used by them. It does not mean, however, that the customer should not consider the threats relevant to those layers. Those threats still exist, though resulting risks, as well as mitigating controls, may be different.

Often, the aspects of security could be outsourced or delegated to a cloud provider. For example, rather than building a bespoke Key Management solution, a customer may use one offered by a cloud vendor. While this can be generally beneficial to the cloud user and reduce their cost of managing security, it can introduce new problems. Security mechanisms provided by the cloud need to be properly enabled and configured, sometimes integrated with customer workloads.

Finally, customers may take advantage of a platform as service (PaaS) components offered by a cloud vendor. Databases, middleware, and/or streaming services can be costly to manage to achieve high performance and availability. Therefore, customers may select a cloud vendor-managed system for achieving the desired performance and availability. However, just like with security-specific solutions, usage of cloud vendor-managed systems can introduce potential threats related to their proper usage, configuration, and integration with other systems.

Cloud services and the configuration and arrangement of components of cloud services can impact a customer's threat posture. A cloud user's choices in defining their workloads can both introduce and mitigate threats. That relationship is not trivial, however, because some cloud components may mitigate threats introduced by other components.

Provisioning cloud infrastructure can be easy and fast. This can result in a cloud user's ability to build workloads and react to customer demands much faster. Cloud users may deploy applications in a chosen geography, connect elements of their system, or fundamentally change network topology through programmatic interfaces provided by the cloud vendor. Cloud networks can challenge traditional security processes, and in particular threat modeling. The changes to the infrastructure in traditional environments were slow and required planning that left ample time to accommodate threat modeling. However, in the cloud environment, such changes can happen very fast, often reactive to demand or other changing circumstances. It may no longer be viable to perform manual threat modeling.

The system and techniques described herein can map cloud services, resources, their arrangements, and configurations to one or more potential threats. A full threat model of a system may depend on more factors than just selection and arrangement of cloud infrastructure components. The system can provide a subset of the full threat model including threats that can be reliably inferred from cloud service arrangement. The resulting threat model may be considered as a separate one from a manually crafted one or the basis for building a broader one.

In addition, the system may provide accurate recommendations for how to mitigate the threats. The system can rely on three key artifacts. The first artifact can be a classification of threats known by the system and their relations. A second artifact can include information about how specific services or resources in the system introduce and mitigate threats. A third artifact can include resources for arrangement and configuration of the components within a specific environment.

As described above, the usage, inter-operation, and configuration of service components can both introduce or mitigate threats related to other components. Some components may introduce very specific threats and some components can be used for mitigating an entire class of threats. For example, a general threat of "network access to network resource" could be refined as a more narrow threat of "network access to compute instance" and "network access to database."

The cloud environment can be illustrated as a collection of inter-operating resources provided by cloud services. For example, a compute service can provide a "compute instance" resource, and a network service provides a "virtual network" resource, a "subnet" resource, a "load balancer" resource, and an "access control list" resource.

Services may introduce or mitigate threats. For example, a "compute instance" resource can introduce threats related to that compute instance, to using credentials that the instance has and so forth. Another service may mitigate threats. For example, an "Access control list" resource may mitigate network related threats to resources that it covers.

A threat model is a mechanism by which security controls and mechanisms are defined. For a given resource, the threat model can list potential threats, a level of risk for each of the potential threats, and potential mitigation strategies or solutions for each of the potential threats.

A threat model can also be considered a structured representation of all the information that affects the security of an application or system (e.g., the cloud-based system). In essence, it is a view of the application and/or system and their environments through the lens of security.

FIG. 1 illustrates an exemplary cloud workload and environment 100 as an inter-connected set of resources. Cloud workloads and environments can be viewed as inter-connected sets of resources. Resources may be related by referring to one another, for example as a network "subnet" resource that belongs to a specific "virtual network" resource. A compute instance contains interfaces that are part of a specific "subnets." Also, resources in general can be grouped into groups such as compartments or assigned labels. The arrangement of components that make up a cloud environment are programmatically accessible as data on its own and many cloud services provide explicit features that allow analyzing network resources.

A cloud infrastructure can include one or more resources that can be arranged to provide one or more services. In various embodiments, the one or more services can include but is not limited to network services. For example, the one or more resources can include computers, servers, storage devices, and routers that are networked to perform services (e.g., electronic mail, virtual desktops, virtual processors, various types of data storage/management, load balancers, virtual network interfaces, etc.). The specific resources used and the arrangement and/or connections between these resources can present threats to the system. For example, by allowing multiple users access to a system, there can be a threat of unauthorized access to data. Because cloud-based systems can be easily reconfigured with the relationships between components defined using a few lines of code in software, the threats to the cloud-based system can quickly change.

The system described herein can identify the services of the cloud infrastructure via a management layer. The system can determine service information and configuration information for the services. The service information and configuration information can be obtained from metadata associated with the services and metadata associated with the configuration. The system can construct a virtual environment model based on the service information and the configuration information. The environment model can provide information on the relationships between the components of the cloud infrastructure. The environment model can be used to determine threats to the services. The threats to the services can be determined by analyzing the environment model and accessing a threat information database. The technique can generate a threat model that lists the determined threats to the services. The technique can cross-reference the threats identified in the threat model to generate recommendations for the cloud infrastructure based at least in part on the threat model. The recommendations can be provided to a network developer via a display screen, an output file, or an electronic message. The network developer can decide whether or not to employ the recommendations.

This disclosure describes an example system that maps cloud services, resources, the service arrangement, and configuration to potential threats. This technique takes a novel look at the problem of threat modeling in determining that there are no intrinsic threats. Both introduction of threats and mitigation can result from various components used for cloud services. A full threat model of a system may depend on more factors than just selection and arrangement of cloud infrastructure components. The proposed system is meant to provide a subset of the full threat model including threats that can be reliably inferred from cloud service arrangement. The resulting threat model may be considered as a separate one from a manually crafted one.

In addition, the system may provide accurate recommendations of how to mitigate the threats. The example system relies on three key artifacts: classification of threats known by the system and their relationships; information about how specific services or resources in the system introduce and mitigate threats; and resource arrangement and configuration within a specific environment FIG. 1 further illustrates a plurality of services such as Service-A 102, Service-B 104, Service-C 106, and Service-D 108. Service-A 102 can include Resource-X 110. Service-B 104 can include Resource-Y 112. Service-D 108 can include Resource-Z 114. While FIG. 1 illustrates four services and three resources, this disclosure is not so limited. One skilled in the art would appreciate that such a system can include any number of services and any number of resources. One service can include a virtual network subnet. Another service can include a load balancer. An example resource can include an access control list.

As an example, Service-A 102 may introduce various threats (e.g., Threat-1 116). For example, Service-A can be linking a compute instance to a cloud based system. Linking the compute instance to the cloud-based system can introduce threats to the system. For example, a threat may be an unauthorized user connecting to or hacking into the system. The risk that there can be a threat multiplies by the likelihood of the threat occurring. A mitigation strategy can include not placing the compute instance on a publicly available subnet. Connecting the compute instance on an internal network would potentially mitigate the identified threat. An alternate mitigating strategy can include placing a firewall in front of the compute instance on the network or close Secure Shell access to the compute instance. Other threats can include but are not limited to unauthorized access, or to a compute machine that becomes unresponsive due to excessive load. Threats can also exist because of resource arrangement and configuration within the specific environment, Service-B 104 may mitigate Threat-1 116. For example, Service-B 104 can include Resource-Y 112. Resource-Y 112 can be an access control list. The access control list can determine who has access to particular components of the network. The access control list can be used to mitigate the unauthorized user Threat-1 116. Service-C 106 may introduce Threat-2 118. Threat-2 118 can be mitigated by Service-B 104 and Service-C 106. Service-D 108 can introduce Threat-3 120. Threat-3 120 can be mitigated by Service-C 106. Not all threats will have services that mitigate the threats. For example, as illustrated in FIG. 1, Service-D 108 can introduce Threat-4 122 and there is no identified mitigation service.

As the cloud building blocks become standardized, and the properties of various components (e.g., a compute instance) are known, it becomes possible to identify the various risks associated with the different resources. There is a finite set of properties of those resources and finite number of ways they can be combined. The potential threats for a system and possible mitigations can be understood by analyzing the system resources and arrangements.

Figure 2:
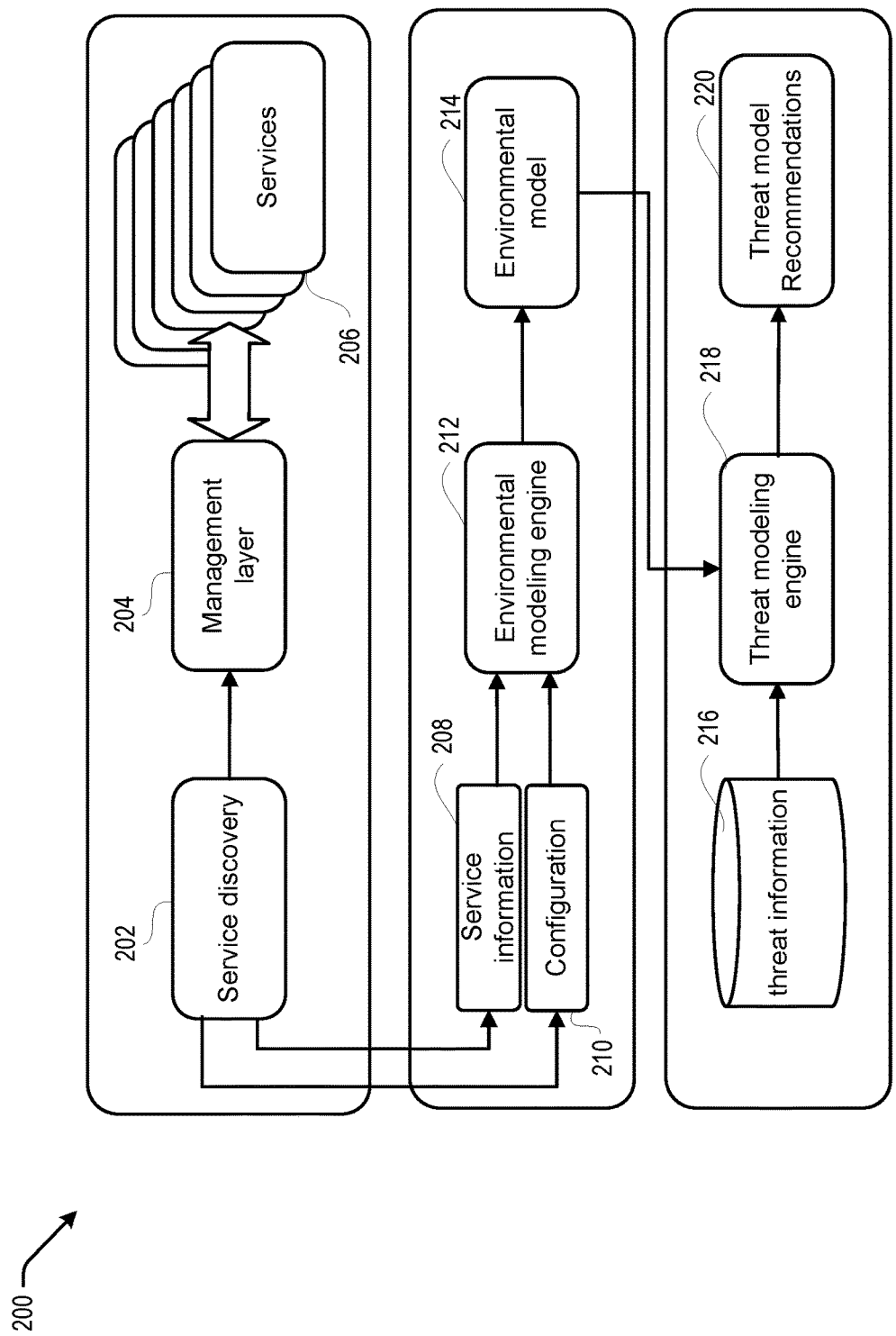
FIG. 2 illustrates an exemplary process for modeling threats.

FIG. 2 illustrates a first flowchart for an exemplary process 200 for modeling threats. This process 200 is illustrated as logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described are not intended to be construed as a limitation, and any number of the described operations can be combined in any order and/or in parallel to implement the processes 200.

The process 200 can include a service discovery 202. During service discovery 202, the process 200 can include determining a management layer 204. The management layer 204 can provide information on one or more services 206 associated with the network (e.g., a cloud based network). The service discovery 202 process can include analyzing the metadata for the one or more services 206 associated with the network. The metadata for the services 206 can be compared with a library of services to provide service information 208. The service information 208 can include capabilities and threats associated with each of the services 206.

An input to the system can include a known set of risks and their relationships. In various embodiments this known set of risks and their relationships can be shared between multiple cloud vendors, or can be specific to one. A known set of risks and mitigations can be introduced by services and resources. The services and resources can be specific to particular cloud vendor, a cloud account, or a specific workload.

The first step can be to identify service configuration and arrangement of components in the service, e.g., compartments, networks, compute instances, subnets, firewalls, databases, etc. A cloud visualizer tool can be used to identify service configuration and arrangement of components. The system can map cloud services and resources. Services can include a virtual cloud network (VCN). A resource can include a particular network, a particular subnet, a particular load balancer, etc. This can be accomplished by accessing information about cloud resources provided by cloud control plane and analyzing relationship between these resources.

The second step can be to identify threats for each grouping of resources. Each grouping can include multiple subnets. Customers can introduce specific sets of groupings. For example, customers can divide the cloud infrastructure into various components. The compartments can be categorized as high integrity compartments and low integrity compartments. The compartments can include resources. This can mean that risks are identified for specific resources, and then also presented for groups of resources and all resources together. Certain risks can also be identified for the service configuration. The risks can be identified by mapping customer-specific cloud resources to cloud vendor-specific risks for each of the resources.

For example, a service such as a compute service with a compute instance and network service can provide a virtual network subnet and one or more load balancers or access control list resources. In the cloud, those resources can be encoded using APIs. These services may introduce and/or mitigate threats. For example, compute resources can introduce a threat to the system related to that compute instance such as using credentials to provide access to different users.

Certain resources can mitigate this threat. For example, an access control list is a resource that mitigates threats related to network access. The cloud can have a thoroughly structured, quite rigid set of resources. Those resources will have their own types and properties. The cloud can be represented as a graph of connected resources.

The input to the system can be a known set of risks and their relationships. The risks and relationships can be static for a particular cloud vendor because for risks and mitigations introduced by a particular cloud vendor's services and resources can be known.

One benefit of using these techniques is to provide a scope of potential threats that one might have not considered. The techniques can give awareness to threats that exist and also mitigations. For example, a system may include a cloud infrastructure that includes seven virtual networks. In every virtual network, there can be 20 subnets. 138 of the total of 140 subnets can employ access control lists, but two subnets do not. The techniques can identify the subnet structure and identify the subnets that use access control lists. This can identify a vulnerability or risk in the subnets that do not employ access control lists and identify a threat of unauthorized access. The system employs a mitigating control by implementing an access control list but this mitigation is missing in two subnets. This risk can be visualized in a user interface (UI) that presents the threat model or the secondary threat model.

The third step can be to identify potential mitigations that already exist in the system and include that information.

The service discovery 202 process can include analyzing the metadata for the one or more services 206 associated with the network to determine a configuration 210. The metadata for the services 206 can provide configuration information. The configuration information can be compared with a library of possible configurations. The configuration information can provide information on capabilities and threats of the network. The service information 208 and the configuration information 210 can be sent to the environmental modeling engine 212.

The process 200 can include an environmental modeling engine 212 generating an environmental model 214. The environmental model 214 can provide a list of services, capabilities, resources, and potential threats associated with the network. The environmental model 214 can be sent to the threat modeling engine 218. The threat modeling engine 218 can access the list of services, capabilities, resources, and potential threats associated with the network of the environmental model 214 to determine a list of potential threats. The threat modeling engine 212 can compare the information of the environmental model 214 with one or more threats stored in a threat information database 216. The threat modeling engine 218 can analyze the one or more potential threats and access the threat information database 216 to determine one or more mitigation strategies to mitigate or eliminate the potential threats. The threat modeling engine 218 can output one or more threat model recommendations 220 to a network developer. The one or more threat model recommendations 220, if employed, may mitigate or eliminate the potential threats identified by the threat modeling engine 218.

An additional feature of the disclosed system can be an ability to provide recommendations for changes in the cloud environment and provide recommendations. These recommendations may be based on known services and resources in a cloud environment that provide mitigations to the threats identified in a specific environment. For example a system may recommend adding an "Access Control List" to a subnet to mitigate "Unauthorized network access" threat.

The system can be advanced in how it maps resources with each other and reflects any way of grouping resources available in a cloud environment. For example, ways of grouping can include direct resource relationship, sharing a group, sharing a label being related to a third resource, etc.

The system can be advanced in how it interprets threats and mitigations originating from its resources. This could be just a presence of a resource, but could also be specific properties of a resource, properties over a set of resources, resource arrangement, etc.

The system can be configured with a hierarchy of threats. The higher-level threat, "Unauthorized access to network resource" can include two more specific ones related to internal and external access.

This data can be configuration of the system specific to the particular cloud vendor. It can include risks associated with cloud services and resources provided by the vendor. The sample list can be limited to facilitate the minimal useful example. Table 1 provides an example list of services, resources, potential threats, and potential mitigation strategies.

TABLE 1

| Service | Resource | Introduces Risk | Mitigates Risk |
| --- | --- | --- | --- |
| Virtual Networking | virtual network | Unauthorized access to network resource | |
| | subnet (type = public) | Unauthorized external access to network resource; Unauthorized internal access to network resource | |
| | subnet (type = private) | | Unauthorized external access to network resource |
| | access control list | | Unauthorized access to network resource |
| Computer | instance | Unauthorized access to network resource | |

Cloud resources can both introduce or mitigate threats. Multiple resources from the same service can introduce or mitigate threats in different ways. The threats introduced/mitigated may be at different levels of threat hierarchy. For example, a general resource of "virtual network" can introduce a high-level "Unauthorized access to network resource" threat, while subnet resource introduces specific threats for internal/external access. In addition, threats may be introduced/mitigated differently depending on the specific properties of a resource. For example, property "type" of resource "subnet" can define whether a particular network subnet is publicly accessible. Therefore, the public subnet introduces threats related to both internal and external access, while the private subnet introduces the threat of internal access but mitigates one related to external.

Threats can be classified based on impact to a system. For example, unauthorized access to the network can be a lower level threat.

The "instance" resource of the "compute" service can be a network device. However, network threats related to it can be largely dependent on the network it is located in. Therefore, it can introduce a general threat of unauthorized access.

Mapping services and resources of various types to threats can be specific to cloud vendors and likely is performed by the vendor with the understanding of their services, or a third party contracted by the vendor or by user for a specific vendor. As mentioned before, in practice, many more threats will be specified. For example, compute instance will introduce many more threats related to processing, unauthorized process execution, denial of service, and so forth. These threats were omitted here to provide a complete yet constrained example.

In an example of the technique, company A migrates their workload into cloud. When the company is moving to the cloud, they are accessing all of their resources which were locally accessible. They could just log into the workstation and go to the computer service. But now that it is in the cloud, they have to go through the Internet and access their compute workload. In order to get the compute workload, the customer connects to the Internet. The customer can connect to that computer system and identify where all the data sources are stored. The customer can establish a virtual network as a service from the cloud, which can provide the client access to the Internet and access to the outside world.

As soon as the customer connects to the virtual network, the customer is introducing new threats because now this is open access and the data is stored in the cloud. Because of this, the customer can be introducing new threats to this compute system. The customer may want to build an application server where customers can come and log in and do some work. In order to accomplish that, the customer may have a front end API which is receiving the request. API calls can be made by a customer or the business. As this front end API can include a web application providing access to a public network, this inherently introduces threats to the API server. Such a publicly accessible network can introduce entire classes of threats which come with having your computer on the public network. These threats can include data denial of service, password injection, password cracking, and other various threats. These identified risks are introduced risks that are introduced by providing the compute system access to the network.

For this example, for the mitigation process on these different threats that are happening to the backend application, front ended by these APIs, companies can subscribe to a load balancer service. A load balancer can include a firewall and access control included. After employing the load balancer service, the customer can start launching the application load balancer which can provide an application that will specify a security posture as well.

The application load balancer can service the customer's image prompts which company A can be receiving from the customer. The application load balancer can be configured through using a back-end as opposed to a frontend configuration. This type of configuration can mitigate the issue of direct link service or injection attacks because these types of threats can be limited to a frontend load balancer. Now that the load balancers are acting as a service, the load balancers can be remediating or mitigating the risk by the virtual network.

In order for the load balancers to service the incoming requests, the load balancers may be conducting an offload of the data behind the load balancers. The load balancer has mitigated some threats but others may remain. For example, the load balancer can introduce some of its own security risks associated with the load balancer itself. In one example, back in the application, trust load balancers can perform a proof of truth. Anything which comes from the load balancer will be accepted by the system proof because the system trusts the load balancer. If the load balancer is not configured or has not been updated with current security patches, it can be vulnerable to command injection risks.

Therefore, the load balancer has authority and it introduces a threat. The load balancer authority can be misused by some attackers. Therefore, the load balancer can introduce its own set of threats. The system can have had another risk that was previously mitigated by incorporation of a load balancer. Now the load balancer introduces these new threats. In order to mitigate the threats introduced by the load balancer, the system would have to trust the load balancer. Therefore, the system can establish a protocol to understand or accept authentication of the devices. In addition, there can be a set of firewalls or Internet Protocol access controls to ensure that only specific Internet Protocols are allowed to connect to the firewall or connect to the load balancer.

Figure 3:
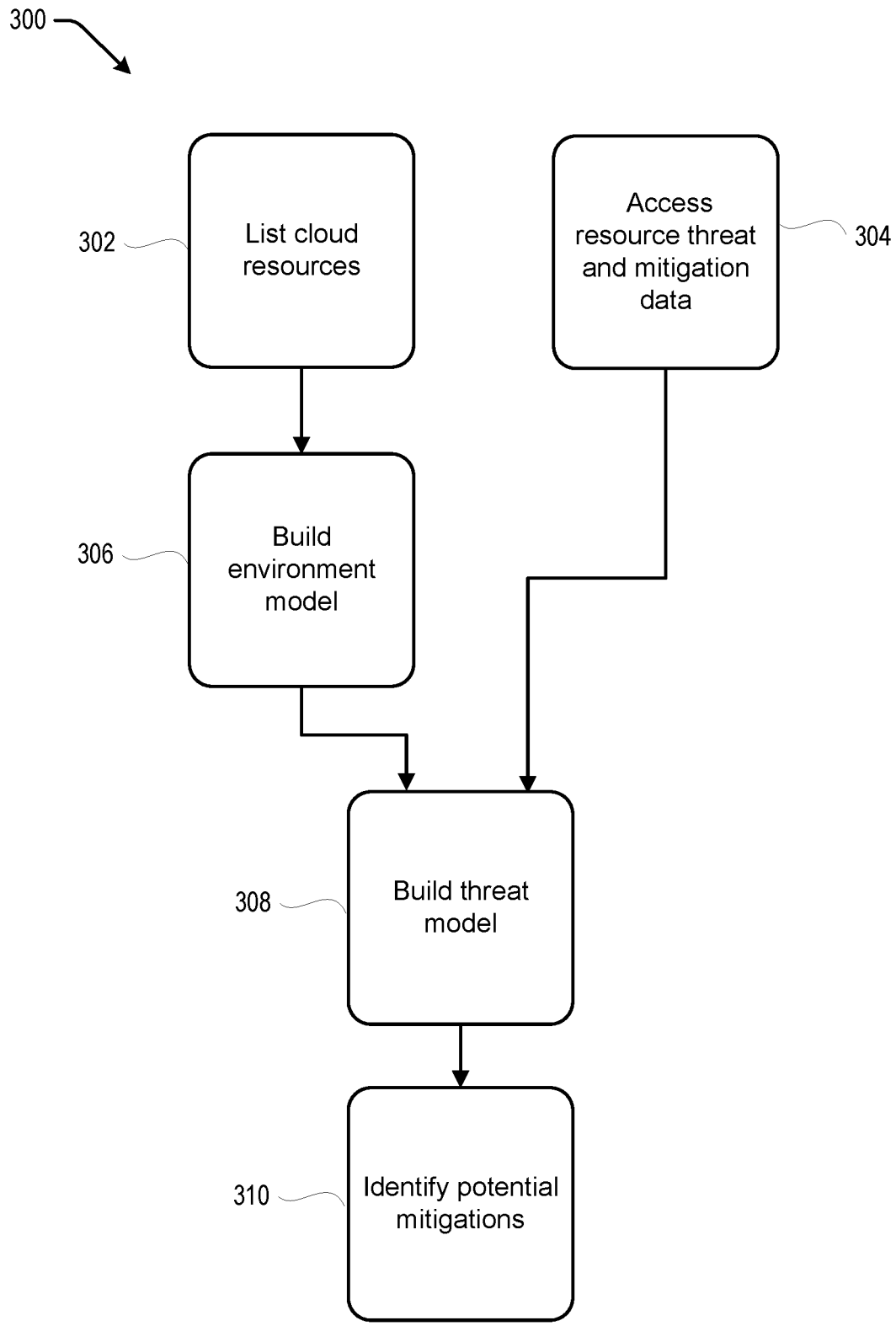
FIG. 3 illustrates a first flowchart for an exemplary process for modeling threats.

FIG. 3 illustrates a second flowchart for an exemplary process 300 for modeling threats. This process 300 is illustrated as logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described are not intended to be construed as a limitation, and any number of the described operations can be combined in any order and/or in parallel to implement the processes 300.

The process 300 can include analyzing the network to generate, at block 302, a list of the cloud infrastructure resources. The cloud resources can include one or more services and one or more resources. The list of cloud resources can be stored in a memory. The cloud resources can include metadata for the services or the resources. The metadata can provide the service information 208 and the configuration information 210 as shown in FIG. 2. The configuration can identify the components and the relationships between those components.

For example, a service can include a compute instance, a virtual network subnet, a load balancer, or access control list resources. In a cloud infrastructure, all those resources can be encoded using application programming interfaces (APIs).

The first step of the system operation is to list cloud resources. This can be accomplished by accessing the cloud control plane and calling the respective APIs to obtain the data. However, in some cases, the set of resources may be obtained through other means. The cloud service can provide an inventory service that allows accessing all the account data in bulk. Also, the data may be obtained from static resources such as cloud infrastructure configuration that can be used during cloud orchestration.

In a sample cloud workload this step can result in the following data:
Account
id: a1
VCN
id: v1
account: a1
address: 10.1.0.0/16
Subnet
id: S1
account: a1

```
vcn: v1
address: 10.1.1.0/24
type: private
Subnet
id: S2
account: a1
vcn: v1
address: 10.1.1.0/24
type: private
Instance
id: i1
account: a1
subnet: s1
Instance
id: i2
account: a1
subnet: s2
```

As shown above, the account identity can be "a1". The virtual cloud network, v1, can include a network address. The virtual cloud network can include multiple cloud subnets (e.g., s1 and s2). The subnetworks can each include a network address and include a type (e.g., public or private). The information listed above for account a1 is exemplary. In practice, the control plane can return much richer information and resources can include many more properties. Also, typical cloud workloads can have many more resources.

At block 304, the process 300 can include accessing resource threat and mitigation data. The resource and mitigation data can be stored in a cloud-based storage network.

At block 306, process 300 can include building an environment model of the cloud-based system. An environment model can include a description of the cloud-based resources and the relationships between the various resources. Relations between the cloud-based resources can have an impact on the threat model. In modern cloud-based environments, resources can have explicit and unambiguous relationships with each other. The most popular type of relationship is containment, where a particular resource is fully contained within another resource. For example, such a parent-child relationship exists between a subnet and a virtual cloud network (VCN). Each subnet belongs to one specific VCN and can be depicted to be part of it.

Some cloud vendors offer resources that are specifically used to group and contain other resources. For example, a cloud service provides a "Compartment" resource that is used specifically to contain resources.

Sometimes the relationship between resources may be more complex and multi-lateral. For example, a compute instance may be part of a pool of instances. In this case, the pool can act as a parent resource. But, at the same time, a compute instance can be located in a subnet in a particular network. As such, it can be contained in both of these resources. Choosing one type of relationship over another can be a matter of their utility for threat modeling. In an example, compute instances can be contained in network subnets as such interpretation can be useful to illustrate network threats. In practical settings, different relationships may be chosen. Also, the system can use multiple types of relationships to build alternative environment models that are best suitable for specific kinds of threats. For example, a network-centric model may be useful for inferring and preventing network threats, as in this example. The data-centric model could be used for threats related to data and its flows, and so forth.

At block 308, the process 300 can include building a threat model. In various embodiments, the list of cloud resources, the environment model, and the resource threat and mitigation data can be used for building the threat model. The threat model can be constructed by cross-referencing the environment model, including the associated metadata for services and resources, with a threat database. The threat database can contain a list of identified threats for each of the various resources and services.

At block 310, the process can include identifying potential mitigations. The threat model can be used to identify various threats. The threats can be cross-referenced with a database of possible mitigation strategies for each of the threats. In various embodiments, the threat model can also list potential mitigation strategies for each of the identified threats.

Figure 4:
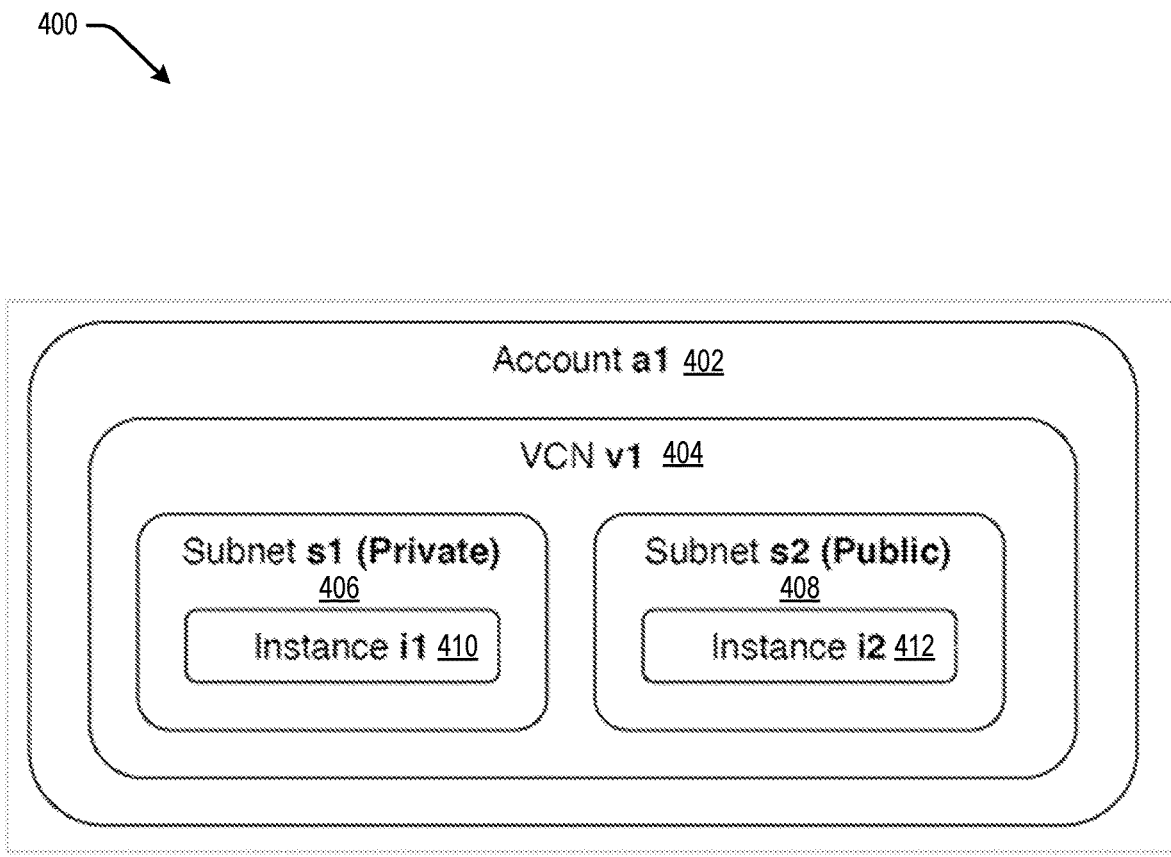
FIG. 4 illustrates modeling an account along with all associated resources and their dependencies identified based on inventory data.

FIG. 4 illustrates modeling an account along with all associated resources and their dependencies identified based on inventory data. FIG. 4 illustrates a block diagram 400 of Account-a1 402.

The generated environmental model identifies a list of resources and associated relationships. For example, subnet-s1 406 and subnet-s2 408 share the common parent resource of virtual client network (VCN)-v1 404. All resources are contained in the parent resource of account-a1 402. This means any risks introduced by instance-i2 412 being attached to a public subnet-s2 408 can be hierarchically scoped to VCN-v1 404 and account-a1 402. This data along with threat information can be used to identify services with threats, their scope, and mitigation recommendations.

This step can be an important part of the system operation. It combines cloud vendor-specific threat and hierarchy information, with workload-specific environment information. For each resource, the system maps threats introduced and mitigated, and propagates this information through an environment model.

The following table provides full information on the threat model inferred for the sample workload.

TABLE 2

| Resource | Aggregate Risk | Introduced Risk | Mitigated Risk |
|---|---|---|---|
| Account-a1 | Unauthorized access to network resource Unauthorized external access to network resource Unauthorized internal access to network resource | | |
| VCN-v1 | Unauthorized access to network resource Unauthorized external access to network resource | Unauthorized access to network resource | |

TABLE 2-continued

| Resource | Aggregate Risk | Introduced Risk | Mitigated Risk |
|---|---|---|---|
| | Unauthorized internal access to network resource | | |
| Subnet-s1 | Unauthorized internal access to network resource | Unauthorized internal access to network resource | Unauthorized external access to network resource |
| Subnet-s2 | Unauthorized external access to network resource Unauthorized internal access to network resource | Unauthorized external access to network resource Unauthorized internal access to network resource | |
| Instance-i1 | Unauthorized access to network resource Unauthorized internal access to network resource | Unauthorized access to network resource | |
| Instance-i2 | Unauthorized access to network resource Unauthorized internal access to network resource Unauthorized external access to network resource | Unauthorized access to network resource | |

Table 2 presents an aggregate threat for each resource (that is, risk of the resource and other resources contained within it) as well as specific threats introduced and mitigated by resource. When suitable, the threat hierarchy is also represented for aggregated risks.

For example, private subnet-s2 408 introduces threats related to both internal and external access to the network. Consequently, VCN-v1 404 also includes these threats, even though it only introduces the general threat of unauthorized network access. This example also demonstrates how relationships between elements can impact the threats. For example, instance-i1 410 can introduce an unauthorized network access risk. However, because instance-i1 410 is placed in private subnet-s1 406, the threat of external access can be fully mitigated. The aggregate threat for instance-i2 412 can include only the threat of internal access.

The information presented in the table can be presented in a multi-dimensional format for easy presentation in a written format. In practice, the system may present the information in multiple ways using reporting and graphical interfaces. For example, an executive view may focus on just specific high-level resources such as virtual networks within the account and not provide information on more specific resources contained inside. Alternatively, it may just provide information about the threats at the top of the hierarchy. The system may provide a graphical interface where the environment model is visually represented and allows navigation through the environment structure and analyzing risk in a zoom-in/zoom-out fashion.

Also, when a resource includes multiple resources and only some of them mitigate the risk, the risk may be highlighted in aggregate view as partially mitigated. For example, below Table 3 illustrates present a version of the above table that provides information about which risks are partially mitigated.

TABLE 3

| Resource | Aggregate Risk | Introduced Risk | Mitigated Risk |
|---|---|---|---|
| Account-a1 | Unauthorized access to network resource (partially mitigated) Unauthorized external access to network resource (partially mitigated) Unauthorized internal access to network resource | | |
| VCN-v1 | Unauthorized access to network resource (partially mitigated) Unauthorized external access to network resource (partially mitigated) Unauthorized internal access to network resource | Unauthorized access to network resource | |
| Subnet-s1 | Unauthorized internal access to network resource | Unauthorized internal access to network resource | Unauthorized external access to network resource |

TABLE 3-continued

| Resource | Aggregate Risk | Introduced Risk | Mitigated Risk |
| --- | --- | --- | --- |
| Subnet-s2 | Unauthorized external access to network resource Unauthorized internal access to network resource | Unauthorized external access to network resource Unauthorized internal access to network resource | |
| Instance-i1 | Unauthorized access to network resource Unauthorized internal access to network resource | Unauthorized access to network resource | |
| Instance-i2 | Unauthorized access to network resource Unauthorized internal access to network resource Unauthorized external access to network resource | Unauthorized access to network resource | |

Service information 208 and configuration information 210, shown in FIG. 2, can be sent to the environmental modeling engine 212 to build, at block 306, the environmental model 214 as shown in FIG. 2. Service information 208 and configuration information 210 can be used to build, at block 306, an environment model.

The threat modeling engine 218, shown in FIG. 2, can access, at block 304, resource threat and mitigation data. The resource threat and mitigation data can be stored in a database. The database can be linked to a cloud infrastructure. The resource threat and mitigation data can be accessed through a network. The threat modeling engine 218 can build a threat model. The threat model can provide a list of potential threats and identify, at block 310, potential mitigation strategies. The potential mitigation strategies can be provided to a network developer.

An additional step of system operation is the analysis of the threat model and potential mitigations provided by a cloud vendor to recommend suitable mitigations. Potential mitigations may be identified through mapping threats that exist in the system and cloud vendor-specific information about mitigations for the corresponding threats.

In our example, the system may suggest two resources that mitigate threats identified by the system. The first is the private subnet. The system may recommend changing the property of the subnet to 'private' to mitigate external access threats.

The second is access control risk. Having the ability to mitigate general unauthorized access threat, it may be included in each of the subnets or at VCN level to provide mitigation for both internal and external access threats.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
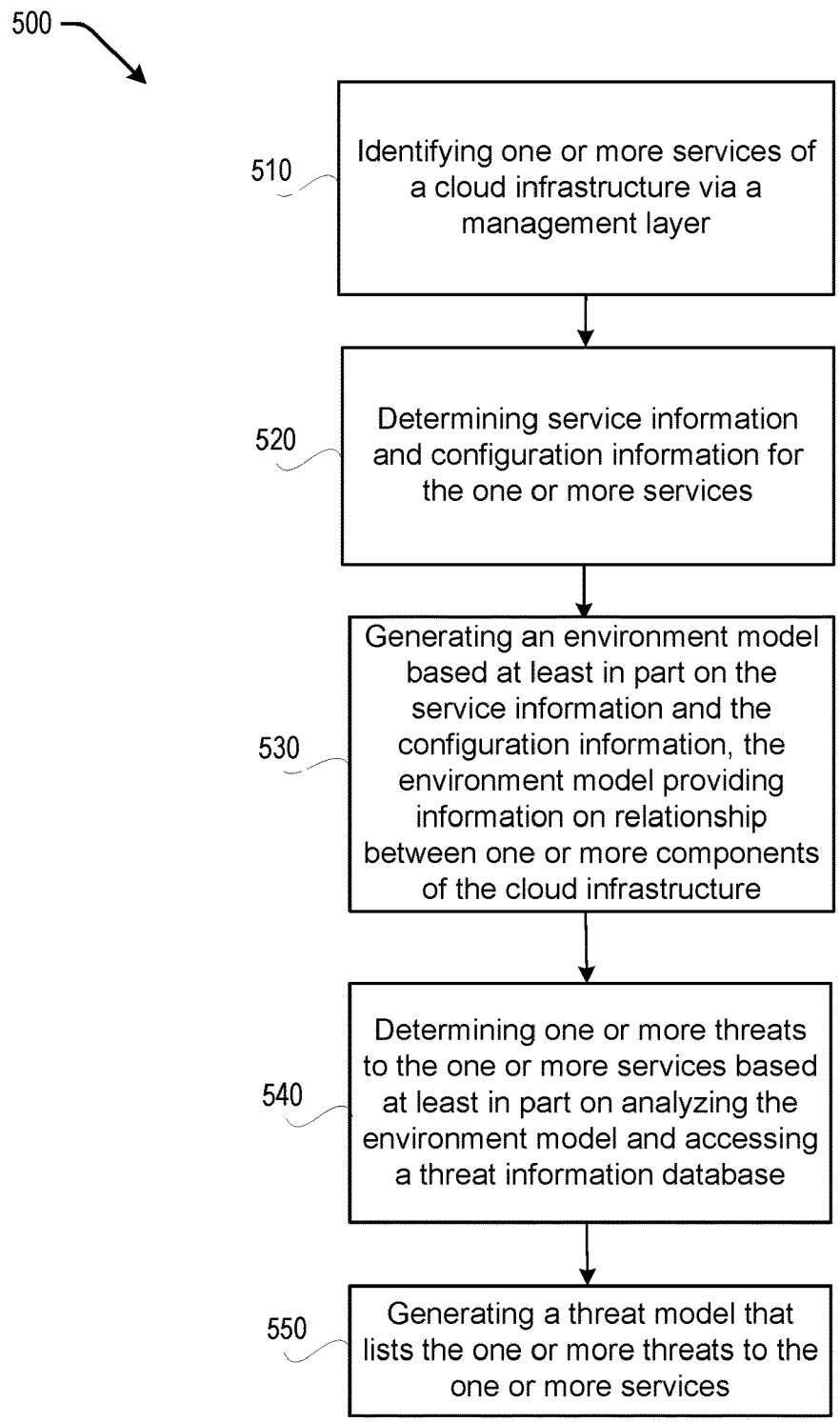
FIG. 5 illustrates an example process for a technique for inferring a threat model in a cloud-native environment

FIG. 5 is a flowchart of an example process 500 associated with a system and techniques for inferring a threat model in a cloud-native environment. In some implementations, one or more process blocks of FIG. 5 may be performed by a server device (e.g., computing device 1000). In some implementations, one or more process blocks of FIG. 5 may be performed by another device or a group of devices separate from or including the server device. Additionally, or alternatively, one or more process blocks of FIG. 5 may be performed by one or more components of device 1000, such as processing unit 1004, storage subsystem 1018, system memory 1010, computer-readable storage media reader 1020, computer-readable storage medium 1022, communication subsystem 1024, I/O system 1008, and bus subsystem 1002.

At block 510, process 500 may include identifying one or more services of a cloud infrastructure via a management layer. For example, a server device may identify one or more services of a cloud infrastructure via a management layer, as described above. The one or more services can include but are not limited to compute services, analytics, database services and tools, machine learning and artificial intelligence, networking, software as a service application, security applications, storage applications, developer services, containers and functions, virtual machines, and integration services.

At block 520, process 500 may include determining service information and configuration information for the one or more services. For example, the server device may determine service information and configuration information for the one or more services, as described above. At least one of the service information or the configuration information can be determined based at least in part on metadata stored for each of the one or more services.

In various embodiments, process 500 includes accessing the metadata stored for a particular service of the one or more services, comparing the accessed metadata to a service information database to identify one or more features of the particular service, and storing the one or more features with the particular service in a memory.

In various embodiments, process 500 includes accessing the metadata stored for a particular service of the one or more services, comparing the accessed metadata to a configuration database to identify one or more configurations of the particular service, and storing the one or more configurations for the particular service in a memory.

In various embodiments, process 500 includes receiving information about one or more resources for the cloud infrastructure, wherein the one or more recommendations comprises a recommendation to re-assign the one or more resources. In various embodiments, the one or more resources comprise at least one of a compute instance resource, a virtual network resource, a subnet resource, a load balancer resource, or an access control resource.

At block 530, process 500 may include generating an environment model based at least in part on the service information and the configuration information. The environment model can provide information on the relationship between one or more components of the cloud infrastructure. For example, the server device may generate an environment model based at least in part on the service information and the configuration information, the environment model providing information on the relationship between one or more components of the cloud infrastructure, as described above. The environment model can take the form of a configuration file that provides the configuration of the network and the various connections within the network.

At block 540, process 500 may include determining one or more threats to the one or more services based at least in part on analyzing the environment model and accessing a threat information database. For example, the server device may determine one or more threats to the one or more services based at least in part on analyzing the environment model and accessing a threat information database, as described above. The threats can be determined by cross-referencing the service information and the configuration information with a threat database. Various resources can inherently present one or more threats.

At block 550, process 500 may include generating a threat model that lists the one or more threats to the one or more services. For example, the server device may generate a threat model that lists the one or more threats to the one or more services, as described above. The threat model can be generated using the identified threats that were determined by the service information and the configuration information with a threat database.

At block 560, process 500 may include generating one or more recommendations for the cloud infrastructure based at least in part on the threat model. For example, the server device may generate one or more recommendations for the cloud infrastructure based at least in part on the threat model, as described above. The threat model can be cross-referenced to a threat model database. The threat model database can identify one or more mitigation strategies for one or more identified threats. The one or more mitigation strategies can be provided to a cloud network developer.

In various embodiments, process 500 includes adding a new service to the cloud infrastructure, determining one or more threats to the new service based at least in part on analyzing the environment model and accessing a threat information database, updating the threat model based at least on the threats of the new service, and generating one or more secondary recommendations for the cloud infrastructure based at least in part on the updated threat model.

Process 500 may include additional implementations, such as any single implementation or any combination of implementations described below and/or in connection with one or more other processes described elsewhere herein.

In various embodiments, process 500 includes generating a graphical user interface to allow a user to select one or more services for conducting a threat analysis, receiving a selection of one of the one or more services by a user for generating the threat model, and preparing the one or more recommendations for display on the graphical user interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
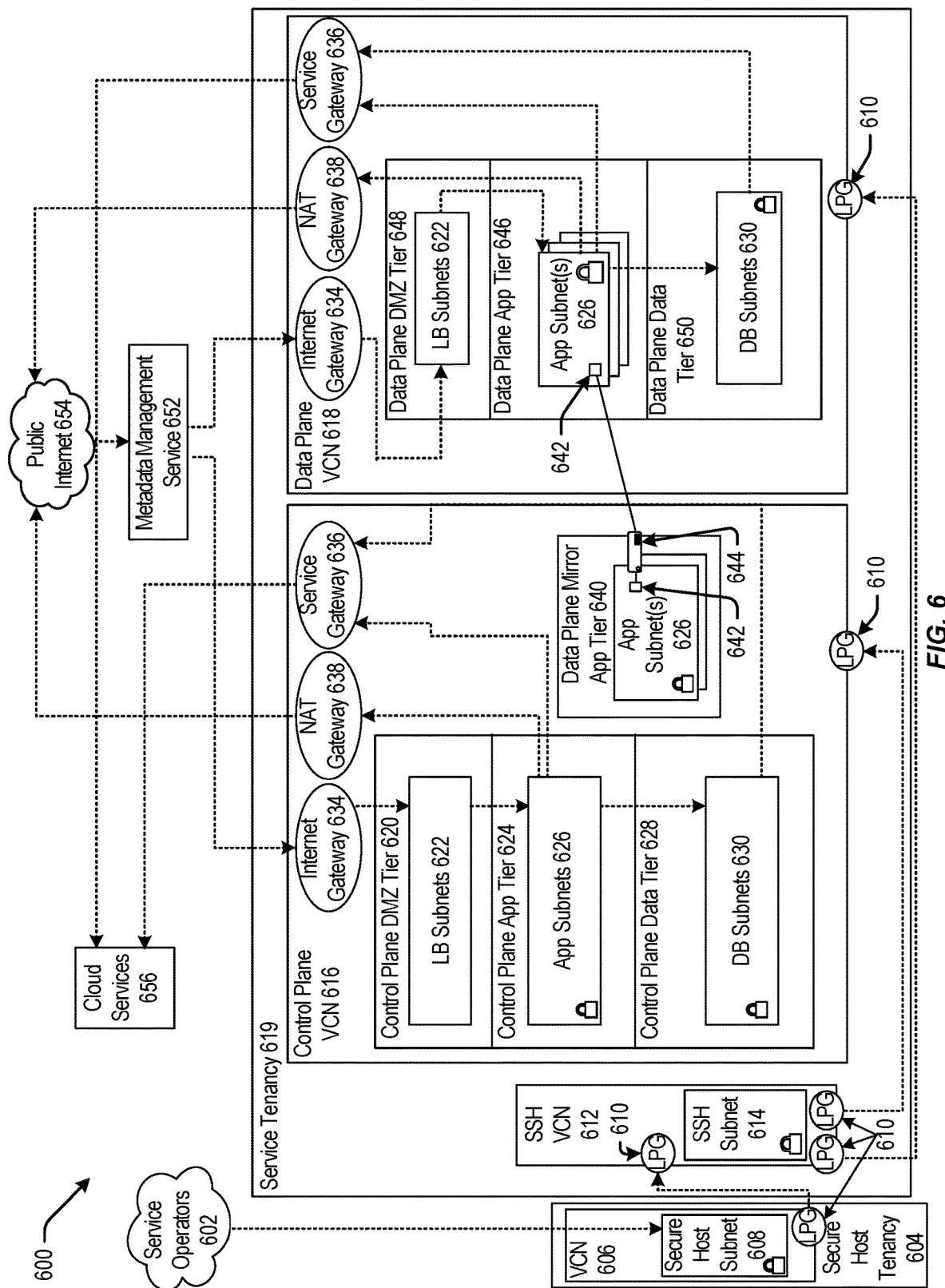
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
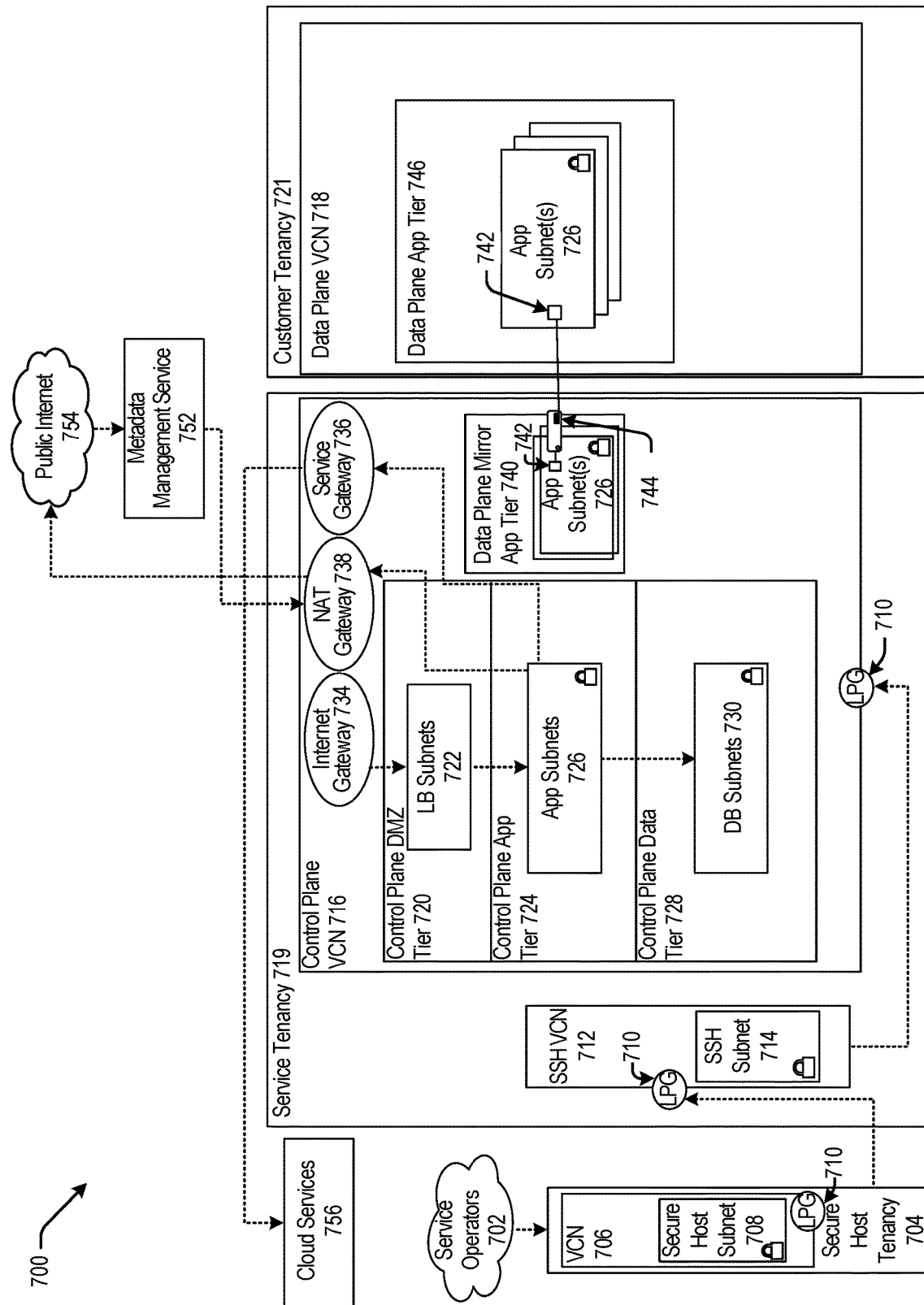
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
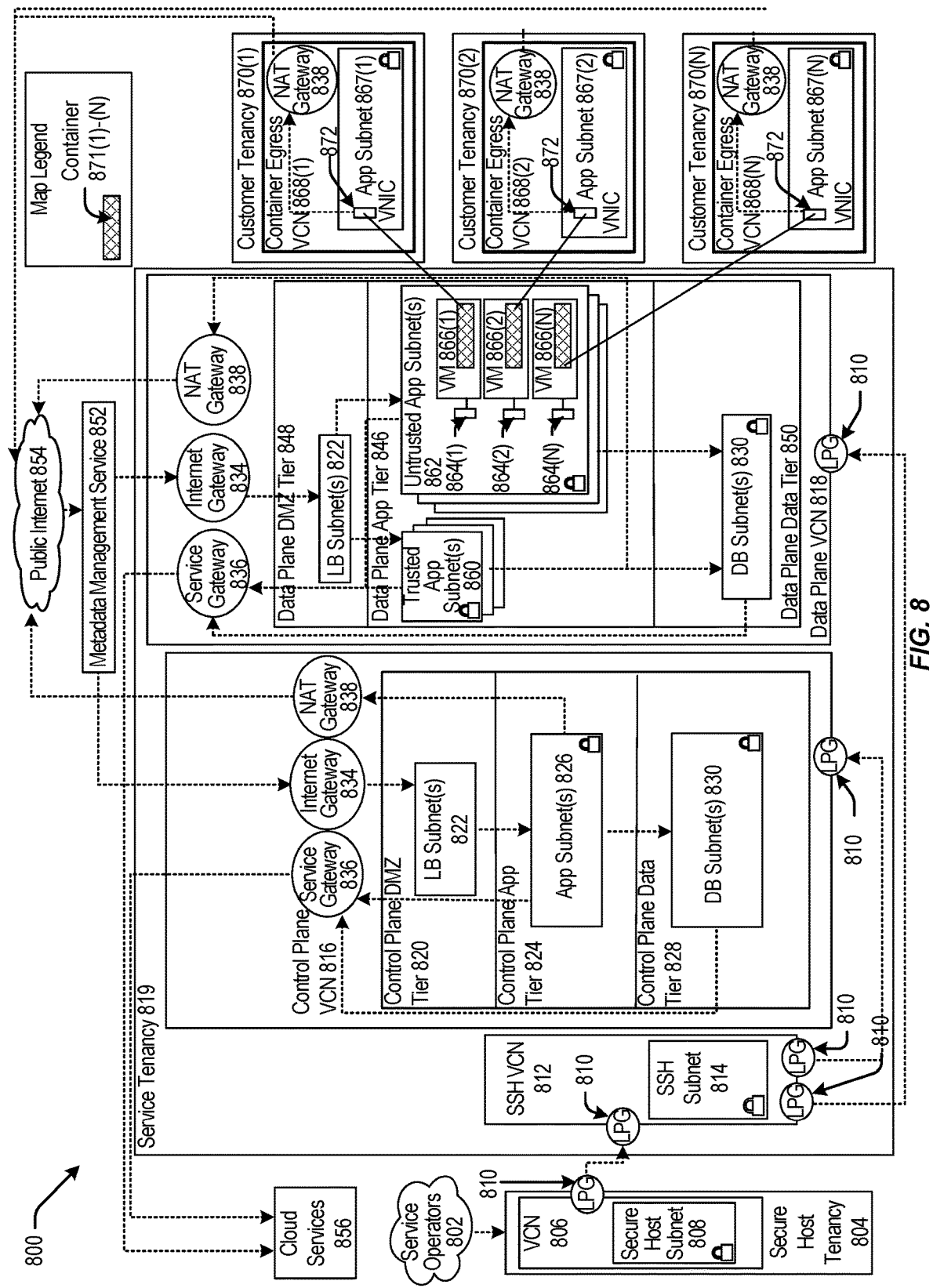
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
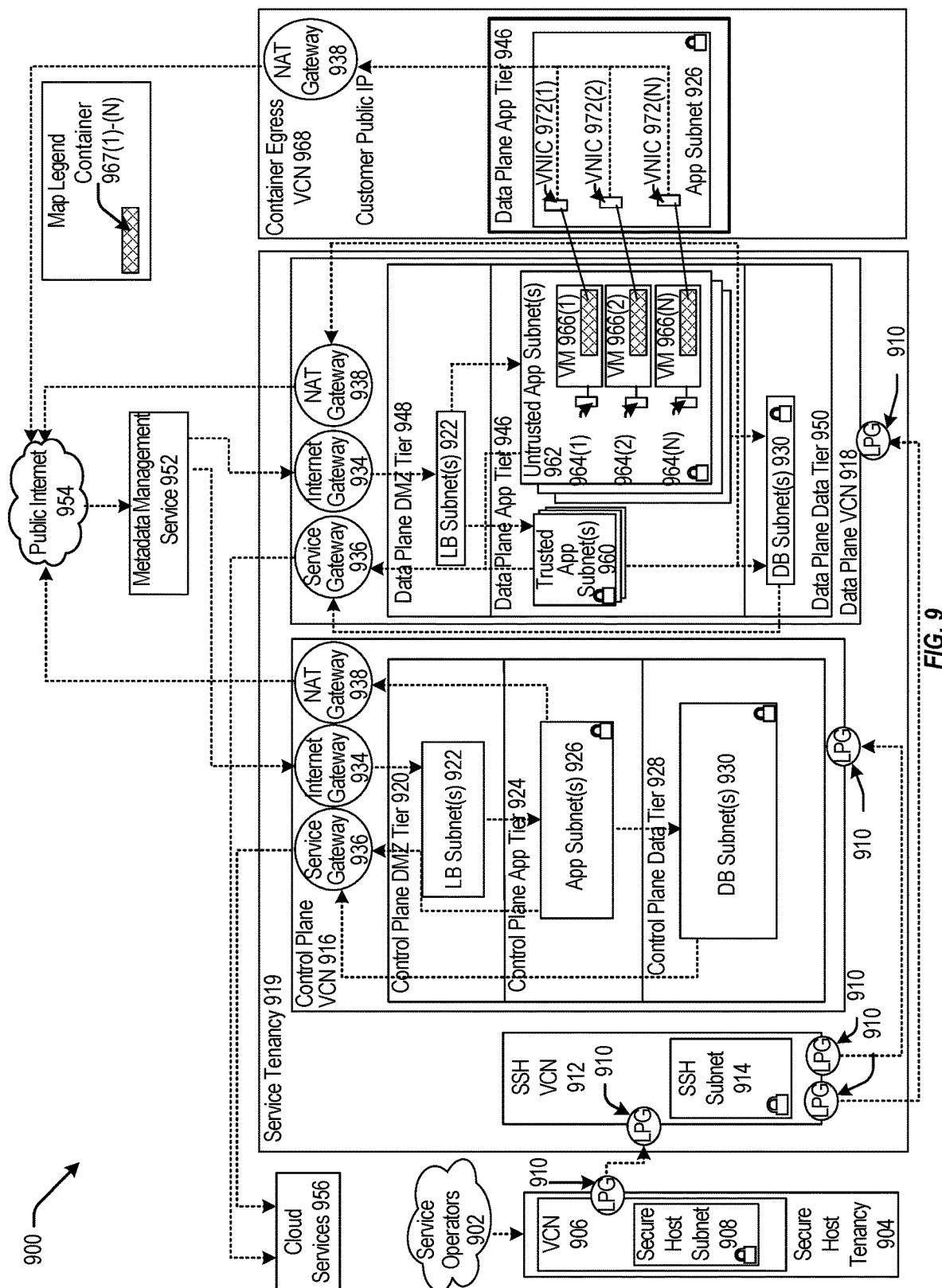
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
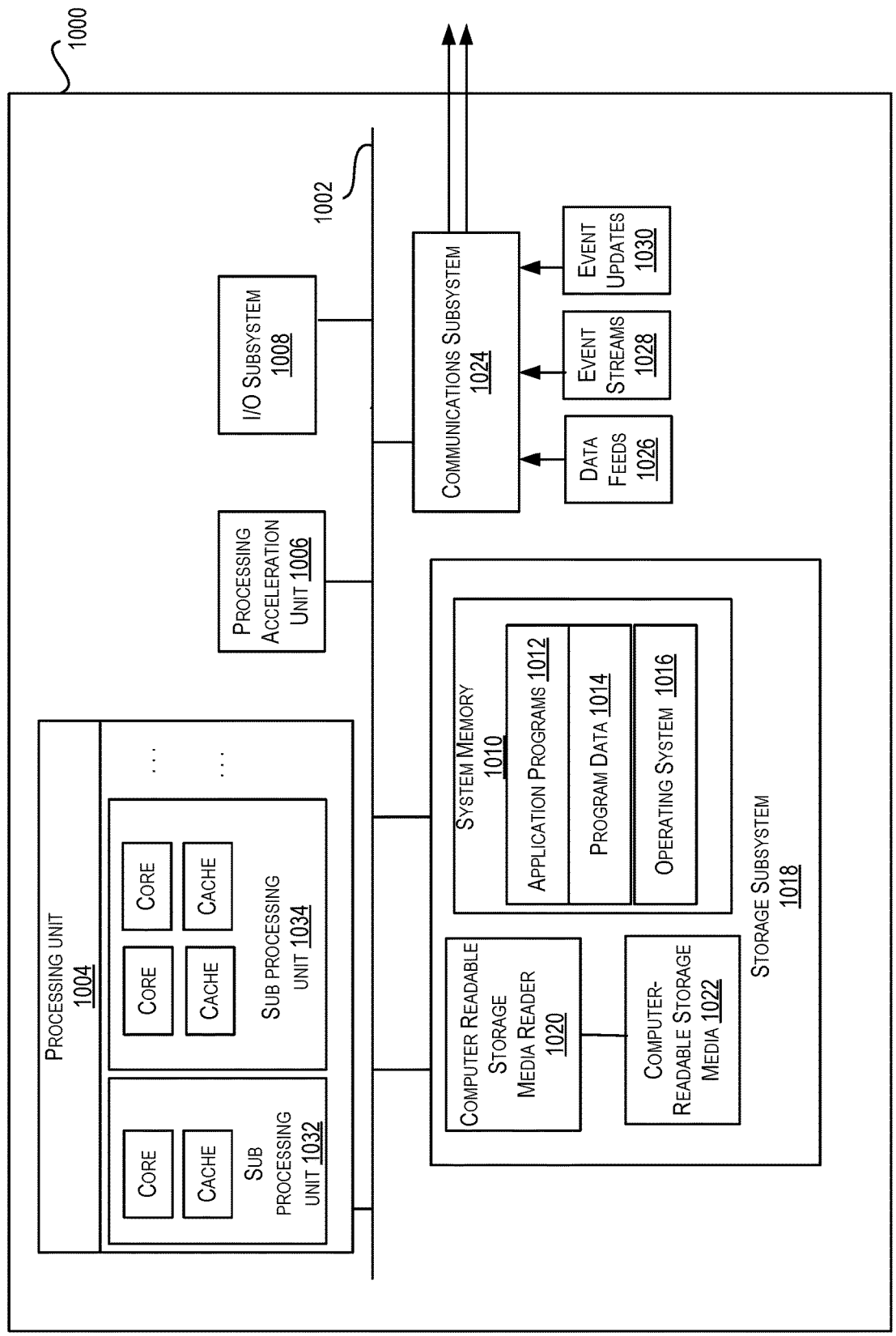
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem

1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
  generating, via a threat modeling engine, a first threat model comprising (a) a first set of one or more threats associated with a first environment model representing a first cloud infrastructure comprising a plurality of services and a plurality of resources, and (b) a first set of one or more potential mitigation strategies comprising at least a first mitigation to mitigate at least a first threat of the first set of one or more threats;
  prior to implementing a first recommendation corresponding to the first mitigation:
    generating, via the threat modeling engine, a second threat model at least by propagating the first set of one or more potential mitigation strategies through the first environment model, wherein the second threat model comprises (a) a second set of one or more threats associated with the first environment model, wherein the second set of one or more threats comprises at least a second threat predicted based on the first mitigation, and (b) a second set of one or more potential mitigation strategies comprising at least a second mitigation to mitigate at least the second threat of the second set of one or more threats;
    generating, via the threat modeling engine, a plurality of recommendations for the first cloud infrastructure, wherein the plurality of recommendations comprise (a) the first recommendation corresponding to the first mitigation, and (b) a second recommendation corresponding to the second mitigation,
      wherein the first cloud infrastructure is modified at least by implementing the first recommendation and the second recommendation.

2. The method of claim 1, further comprising:
  prior to generating the first threat model, generating the first environment model based on metadata comprising information pertaining to the plurality of services and the plurality of resources, at least by:
    for each of the plurality of services:
      determining service information for a particular service, and including the service information in the first environment model, wherein the service information comprise one or more features of the particular service, wherein determining the service information comprises:
        accessing a first particular metadata element corresponding to the particular service of the plurality of services,
        comparing the accessed first particular metadata element to a service information database to identify the one or more features of the particular service; and
      determining configuration information for the particular service, and including the configuration information in the first environment model, wherein the configuration information comprises one or more configurations of the particular service, wherein determining the configuration information comprise:
        accessing a second particular metadata element corresponding to the particular service,
        comparing the second particular metadata element to a configuration information database to identify the one or more configurations of the particular service.

3. The method of claim 1, wherein the plurality of resources respectively comprise at least one of: a compute instance resource, a virtual network resource, a subnet resource, a load balancer resource, or an access control resource.

4. The method of claim 1,
  wherein the plurality of services comprises a new service, the new service having been added to the first cloud infrastructure prior to generating the first threat model,
  wherein the first threat of the first set of one or more threats is associated with the new service;
  wherein generating the first threat model comprises updating a previous threat model to reflect the new service having been included in the first environment model.

5. The method of claim 1, further comprising:
  providing for display on graphical user interface, at least one of:
    the first set of one or more threats;
    the first set of one or more potential mitigation strategies;
    the second set of one or more threats;
    the second set of one or more potential mitigation strategies; or
    the plurality of recommendations.

6. The method of claim 1, wherein the first recommendation comprises at least one of:
  adding a first service or a first resource, existing in a first portion the first cloud infrastructure, to a second portion of the first cloud infrastructure, or
  re-assigning a second service or a second resource of the first cloud infrastructure from a third portion of the first cloud infrastructure to a fourth portion of the first cloud infrastructure.

7. The method of claim 1, wherein the second recommendation comprises at least one of:
  adding a first service or a first resource, existing in a first portion the first cloud infrastructure, to a second portion of the first cloud infrastructure, or re-assigning a second service or a second resource of the first cloud infrastructure from a third portion of the first cloud infrastructure to a fourth portion of the first cloud infrastructure.

8. A server device, comprising:
one or more memories; and
one or more processors, communicatively coupled to the one or more memories, configured to perform operations, comprising:
  generating, via a threat modeling engine, a first threat model comprising (a) a first set of one or more threats associated with a first environment model representing a first cloud infrastructure comprising a plurality of services and a plurality of resources, and (b) a first set of one or more potential mitigation strategies comprising at least a first mitigation to mitigate at least a first threat of the first set of one or more threats;
  prior to implementing a first recommendation corresponding to the first mitigation:
    generating, via the threat modeling engine, a second threat model at least by propagating the first set of one or more potential mitigation strategies through the first environment model, wherein the second threat model comprises (a) a second set of one or more threats associated with the first environment model, wherein the second set of one or more threats comprises at least a second threat predicted based on the first mitigation, and (b) a second set of one or more potential mitigation strategies comprising at least a second mitigation to mitigate at least the second threat of the second set of one or more threats;
    generating, via the threat modeling engine, a plurality of recommendations for the first cloud infrastructure, wherein the plurality of recommendations comprise (a) the first recommendation corresponding to the first mitigation, and (b) a second recommendation corresponding to the second mitigation,
      wherein the first cloud infrastructure is modified at least by implementing the first recommendation and the second recommendation.

9. The server device of claim 8, wherein the operations further comprise:
  prior to generating the first threat model, generating the first environment model based on metadata comprising information pertaining to the plurality of services and the plurality of resources, at least by:
  for each of the plurality of services:
    determining service information for a particular service, and including the service information in the first environment model, wherein the service information comprise one or more features of the particular service, wherein determining the service information comprises:
      accessing a first particular metadata element corresponding to the particular service of the plurality of services,
      comparing the first particular metadata element to a service information database to identify the one or more features of the particular service; and
    determining configuration information for the particular service, and including the configuration information in the first environment model, wherein the configuration information comprises one or more configurations of the particular service, wherein determining the configuration information comprise:
      accessing a second particular metadata element corresponding to the particular service,
      comparing the second particular metadata element to a configuration information database to identify the one or more configurations of the particular service.

10. The server device of claim 8, wherein the plurality of resources respectively comprise at least one of: a compute instance resource, a virtual network resource, a subnet resource, a load balancer resource, or an access control resource.

11. The server device of claim 8,
  wherein the plurality of services comprises a new service, the new service having been added to the first cloud infrastructure prior to generating the first threat model,
  wherein the first threat of the first set of one or more threats is associated with the new service;
  wherein generating the first threat model comprises updating a previous threat model to reflect the new service having been included in the first environment model.

12. The server device of claim 8, wherein the operations further comprise:
  providing for display on a graphical user interface, at least one of:
    the first set of one or more threats;
    the first set of one or more potential mitigation strategies;
    the second set of one or more threats;
    the second set of one or more potential mitigation strategies; or
    the plurality of recommendations.

13. The server device of claim 8, wherein the first recommendation comprises at least one of:
  adding a first service or a first resource, existing in a first portion the first cloud infrastructure, to a second portion of the first cloud infrastructure, or
  re-assigning a second service or a second resource of the first cloud infrastructure from a third portion of the first cloud infrastructure to a fourth portion of the first cloud infrastructure.

14. The server device of claim 8, wherein the second recommendation comprises at least one of:
  adding a first service or a first resource, existing in a first portion the first cloud infrastructure, to a second portion of the first cloud infrastructure, or
  re-assigning a second service or a second resource of the first cloud infrastructure from a third portion of the first cloud infrastructure to a fourth portion of the first cloud infrastructure.

15. A non-transitory computer-readable medium comprising
  instructions that, when executed by one or more processors of a computing device, cause performance operations comprising:
    generating, via a threat modeling engine, a first threat model comprising (a) a first set of one or more threats associated with a first environment model representing a first cloud infrastructure comprising a plurality of services and a plurality of resources, and (b) a first set of one or more potential mitigation strategies comprising at least a first mitigation to mitigate at least a first threat of the first set of one or more threats;

prior to implementing a first recommendation corresponding to the first mitigation:
generating, via the threat modeling engine, a second threat model at least by propagating the first set of one or more potential mitigation strategies through the first environment model, wherein the second threat model comprises (a) a second set of one or more threats associated with the first environment model, wherein the second set of one or more threats comprises at least a second threat predicted based on the first mitigation, and (b) a second set of one or more potential mitigation strategies comprising at least a second mitigation to mitigate at least the second threat of the second set of one or more threats;
generating, via the threat modeling engine, a plurality of recommendations for the first cloud infrastructure, wherein the plurality of recommendations comprise (a) the first recommendation corresponding to the first mitigation, and (b) a second recommendation corresponding to the second mitigation,
wherein the first cloud infrastructure is modified at least by implementing the first recommendation and the second recommendation.

16. The non-transitory computer-readable medium of claim 15, wherein the operations further comprise:
prior to generating the first threat model, generating the first environment model based on metadata comprising information pertaining to the plurality of services and the plurality of resources, at least by:
for each of the plurality of services:
determining service information for a particular service, and including the service information in the first environment model, wherein the service information comprise one or more features of the particular service, wherein determining the service information comprises:
accessing a first particular metadata element corresponding to the particular service of the plurality of services,
comparing the first particular metadata element to a service information database to identify the one or more features of the particular service; and
determining configuration information for the particular service, and including the configuration information in the first environment model, wherein the configuration information comprises one or more configurations of the particular service, wherein determining the configuration information comprise:
accessing a second particular metadata element corresponding to the particular service,
comparing the second particular metadata element to a configuration information database to identify the one or more configurations of the particular service.

17. The non-transitory computer-readable medium of claim 15, wherein the plurality of resources respectively comprise at least one of: a compute instance resource, a virtual network resource, a subnet resource, a load balancer resource, or an access control resource.

18. The non-transitory computer-readable medium of claim 15,
wherein the plurality of services comprises a new service, the new service having been added to the first cloud infrastructure prior to generating the first threat model, wherein the first threat of the first set of one or more threats is associated with the new service;
wherein generating the first threat model comprises updating a previous threat model to reflect the new service having been included in the first environment model.

19. The non-transitory computer-readable medium of claim 15, wherein the operations further comprise:
providing for display on graphical user interface, at least one of:
the first set of one or more threats;
the first set of one or more potential mitigation strategies;
the second set of one or more threats;
the second set of one or more potential mitigation strategies; or
the plurality of recommendations.

20. The non-transitory computer-readable medium of claim 15, wherein the first recommendation comprises at least one of:
adding a first service or a first resource, existing in a first portion the first cloud infrastructure, to a second portion of the first cloud infrastructure, or
re-assigning a second service or a second resource of the first cloud infrastructure from a third portion of the first cloud infrastructure to a fourth portion of the first cloud infrastructure.

21. The non-transitory computer-readable medium of claim 15, wherein the second recommendation comprises at least one of:
adding a first service or a first resource, existing in a first portion the first cloud infrastructure, to a second portion of the first cloud infrastructure, or
re-assigning a second service or a second resource of the first cloud infrastructure from a third portion of the first cloud infrastructure to a fourth portion of the first cloud infrastructure.

22. The non-transitory computer-readable medium of claim 15, wherein generating first threat model comprises mapping at least a portion of the plurality of resources to the first set of one or more threats, wherein a first resource, of the plurality of resources, is mapped to the first threat.

23. The non-transitory computer-readable medium of claim 22, wherein the first resource comprises a customer-specific cloud resource, and wherein the first threat corresponds to a vendor-specific risk.

24. The non-transitory computer-readable medium of claim 15, wherein the operations further comprise:
prior to modifying the first cloud infrastructure by implementing the first recommendation and the second recommendation:
generating, via the threat modeling engine, a third threat model comprising (a) a third set of one or more threats associated with a second environment model, wherein the second environment model represents an alternative to the first environment model, wherein the second environment model representing a second cloud infrastructure comprising a second plurality of services and a second plurality of resources, and (b) a third set of one or more potential mitigation strategies comprising at least a third mitigation to mitigate at least a third threat of the third set of one or more threats;
generating a comparison of the first cloud infrastructure to the second cloud infrastructure;
selecting the first cloud infrastructure based on the comparison;

modifying the first cloud infrastructure at least by implementing the first recommendation and the second recommendation.

25. The non-transitory computer-readable medium of claim 24, wherein the operations further comprise:
prior to generating the comparison of the first cloud infrastructure to the second cloud infrastructure:
generating, via the threat modeling engine, one or more third recommendations for the second cloud infrastructure;
wherein the comparison comprises:
a first comparison of (i) the plurality of recommendations for the first cloud infrastructure to (ii) the one or more third recommendations for the second cloud infrastructure;
wherein the first cloud infrastructure is selected based on the first comparison.

26. The non-transitory computer-readable medium of claim 15, wherein the operations further comprise:
determining the first set of one or more threats at least by comparing the plurality of services and the plurality of resources to a thread information database.

27. The non-transitory computer-readable medium of claim 15, wherein the first environment model comprises a network configuration, the network configuration comprising the plurality of services and the plurality of resources.

* * * * *